Feb. 8, 1966  J. H. RIEMAN ETAL  3,233,949
SLIDING MECHANISMS
Filed Aug. 1, 1962  4 Sheets-Sheet 1

Inventors
John H. Rieman
Nathan H. Cook
By their Attorney
Vincent A. White

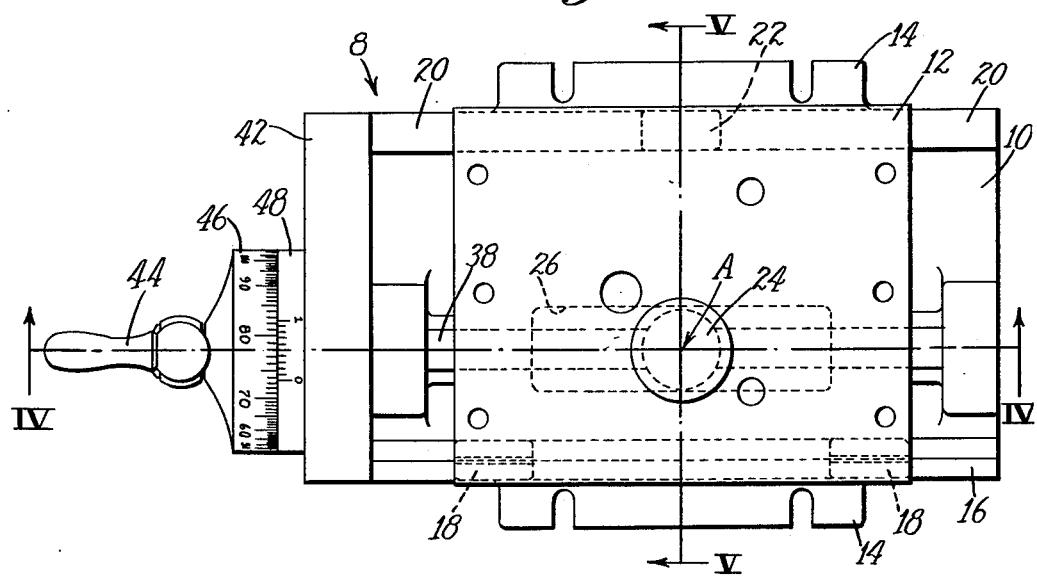
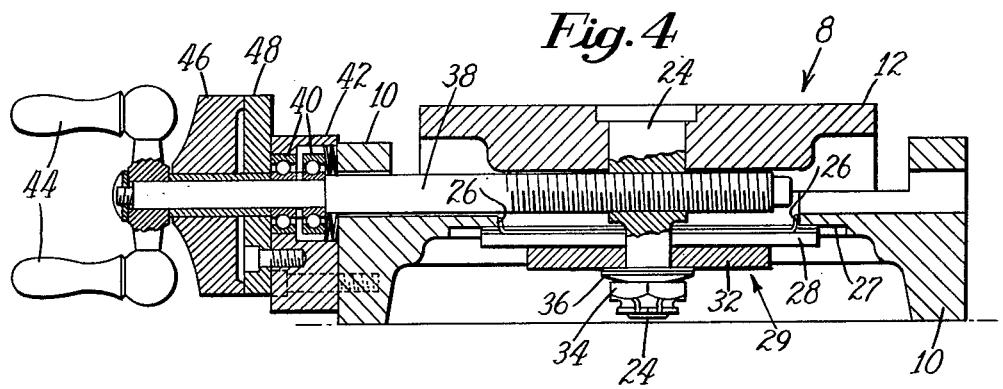
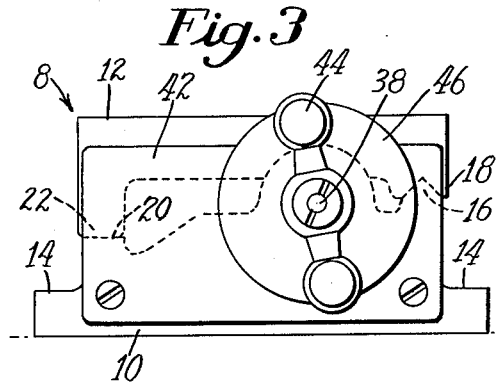
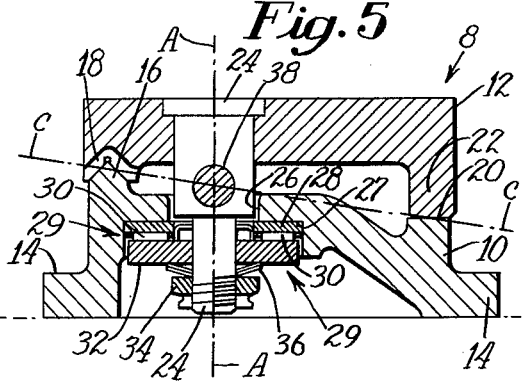

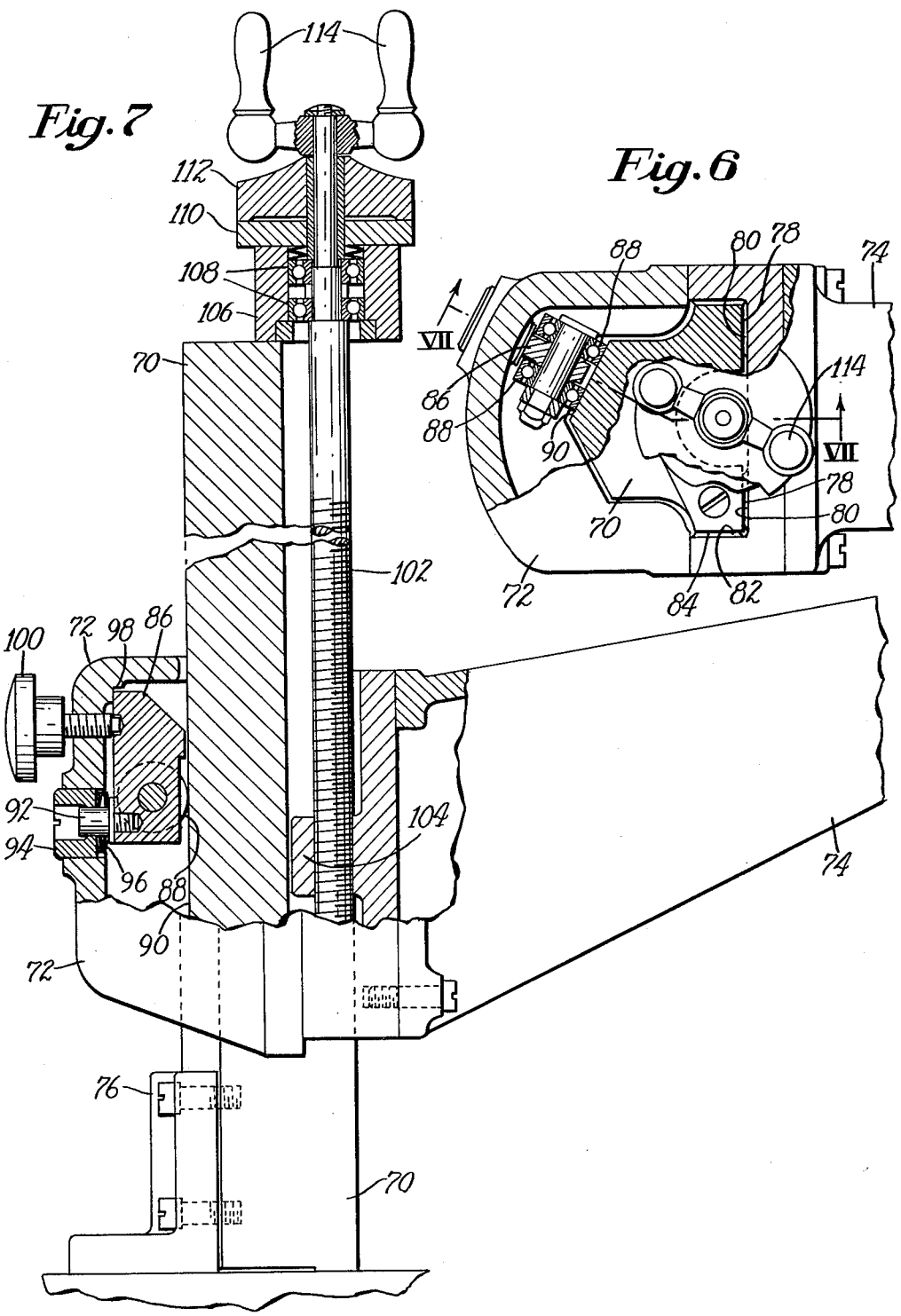

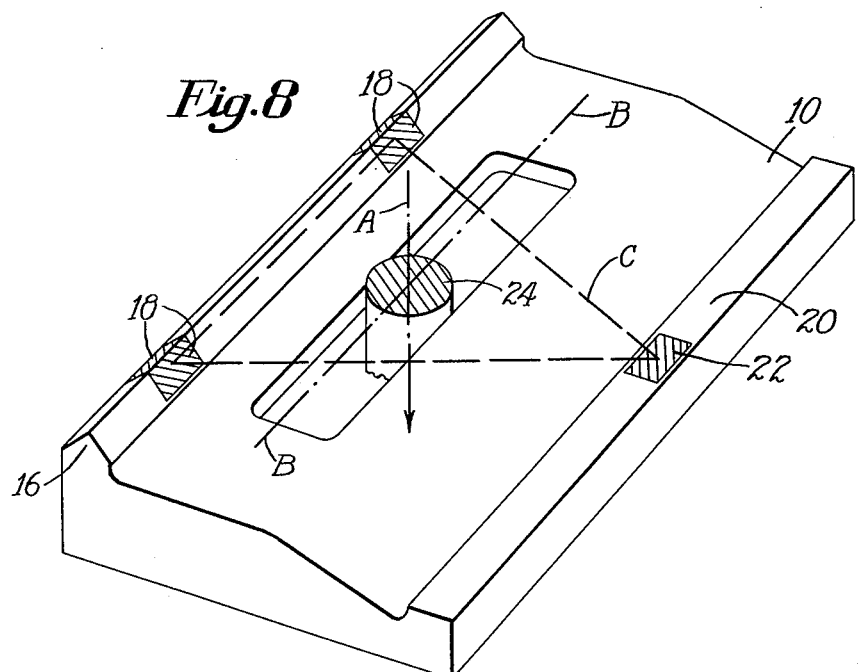
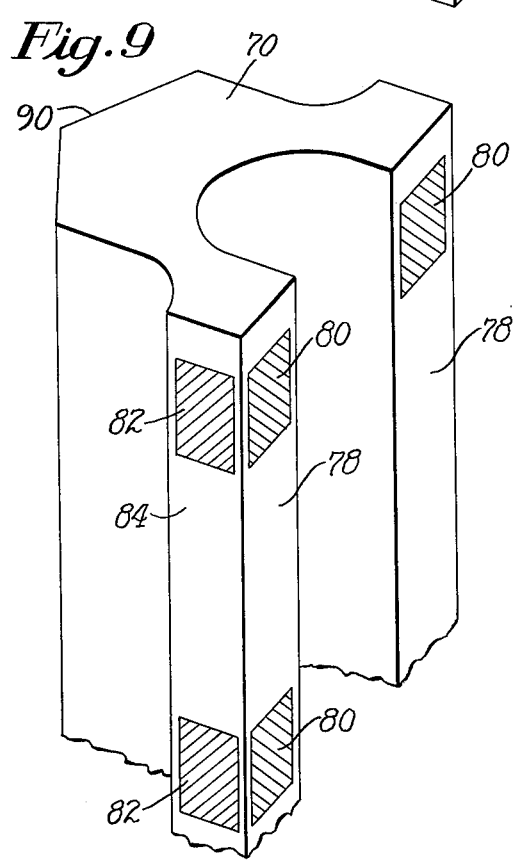
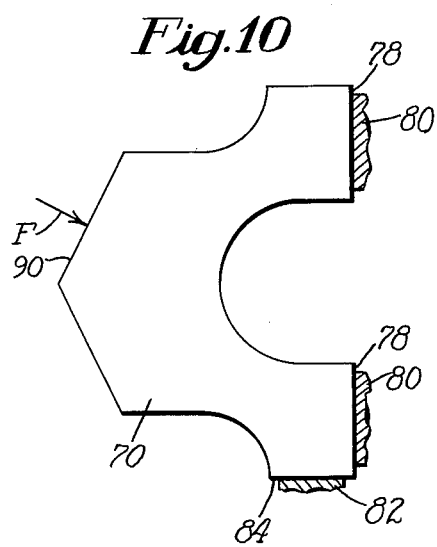

United States Patent Office 3,233,949
Patented Feb. 8, 1966

3,233,949
SLIDING MECHANISMS
John H. Rieman, Ipswich, and Nathan H. Cook, Concord, Mass., assignors to Stocker & Yale, Inc., Marblehead, Mass., a corporation of Massachusetts
Filed Aug. 1, 1962, Ser. No. 214,038
6 Claims. (Cl. 308—3)

This invention relates to precision sliding mechanisms and more particularly is directed to precision locating means and linear bearings for use in devices such for example as measuring and positioning mechanisms or machine tools and the like.

Conventional precision slide mechanisms, while they tend to follow a desired path with sufficient preload, usually are expensive to manufacture when a high degree of precision is required. Many such devices use improper locating techniques from a geometric point of view since they generally utilize four points or flat surfaces to determine a plane. Due to such improper locating techniques, the mating parts of such devices must be fabricated to extreme precision and require skilled hand fitting to give even mediocre performance. Accordingly, it is a general object of the invention to provide improved slide mechanisms which are more precise in their operation and are relatively inexpensive to manufacture. To this end, the planes of motion of the slides are defined according to best geometric principles by three points which, for practical purposes, are areas large enough to support contact loads without galling.

Previously available slide devices using flat continuous bearing surfaces for defining planes of motion have performed with an adequate degree of precision only when heavily preloaded. The heavy preload forces create such friction that when one of the mating elements is forcefully displaced from its required position by an external force, the friction forces tend to keep the parts from re-aligning. In an effort to reduce friction, rolling contact elements have been used between mating surfaces, but this often results in reducing friction to a point where vibrations between mating parts cannot be properly damped. Thus, utilizing three points or areas to define a plane of motion as in the present invention has the affect of substantially reducing the forces of friction so that the preload forces may be of sufficient magnitude to be extremely effective to maintain the mating parts in their proper relations.

Another substantial advantage in the reduction of friction in the manner of the present invention is that less driving force is required to move the mating parts. This appears particularly advantageous when compared with prior devices where forces of friction are so great that the driving force required just to overcome friction results in some warping or distortion of the mating parts seriously affecting accuracy. It must be remembered that in prior devices, friction usually has been reduced only at the expense of accuracy.

According to one feature of the invention the plane of motion between the slide elements is determined by three points while the line or direction of motion is defined by two points. With this sort of an arrangement it becomes entirely practical to provide a preload force which may be applied at one point and in one direction so as to maintain the pads forming the various points on the sliding member in engagement with the ways on the guide member. The disposition of the pads is designed to maximize the torque required to rotate or displace the slide away from its desired position on the guideways. The clamping or preload force is applied at a precise magnitude, position and direction relative to the pads so as to maximize the forces resisting displacement of the slide as well as to maximize the effect of the forces tending to restore the slide to its required position upon displacement by an external torque.

Another feature of the invention provides for the application of the driving force for moving the slide at a position and direction coincident with the direction of force which is the resultant of the sliding friction forces acting on each pad resisting its movement. In this manner, no turning moment is applied to the slide when moved by the driving force.

The above and other features of the invention, together with novel details of construction and combinations of parts will now be described with particular reference to the drawings and thereafter particularly pointed out in the claims.

In the drawings,

FIG. 2 is a plan view of one of the horizontally disposed slide mechanisms shown in FIG. 1;

FIG. 3 is an end elevation of the device shown in FIG. 2;

FIG. 4 is a section on line IV—IV of FIG. 2;

FIG. 5 is a section on line V—V of FIG. 2;

FIG. 6 is a plan view of the vertical slide mechanism shown in FIG. 1;

FIG. 7 is a section on line VII—VII of FIG. 6;

FIG. 8 is a diagram illustrating the principles involved in the horizontal slide mechanism of FIG. 2; and FIGS. 9 and 10 are diagrams illustrating the principles involved in the vertical slide mechanism shown in FIG. 6.

Figure 1:
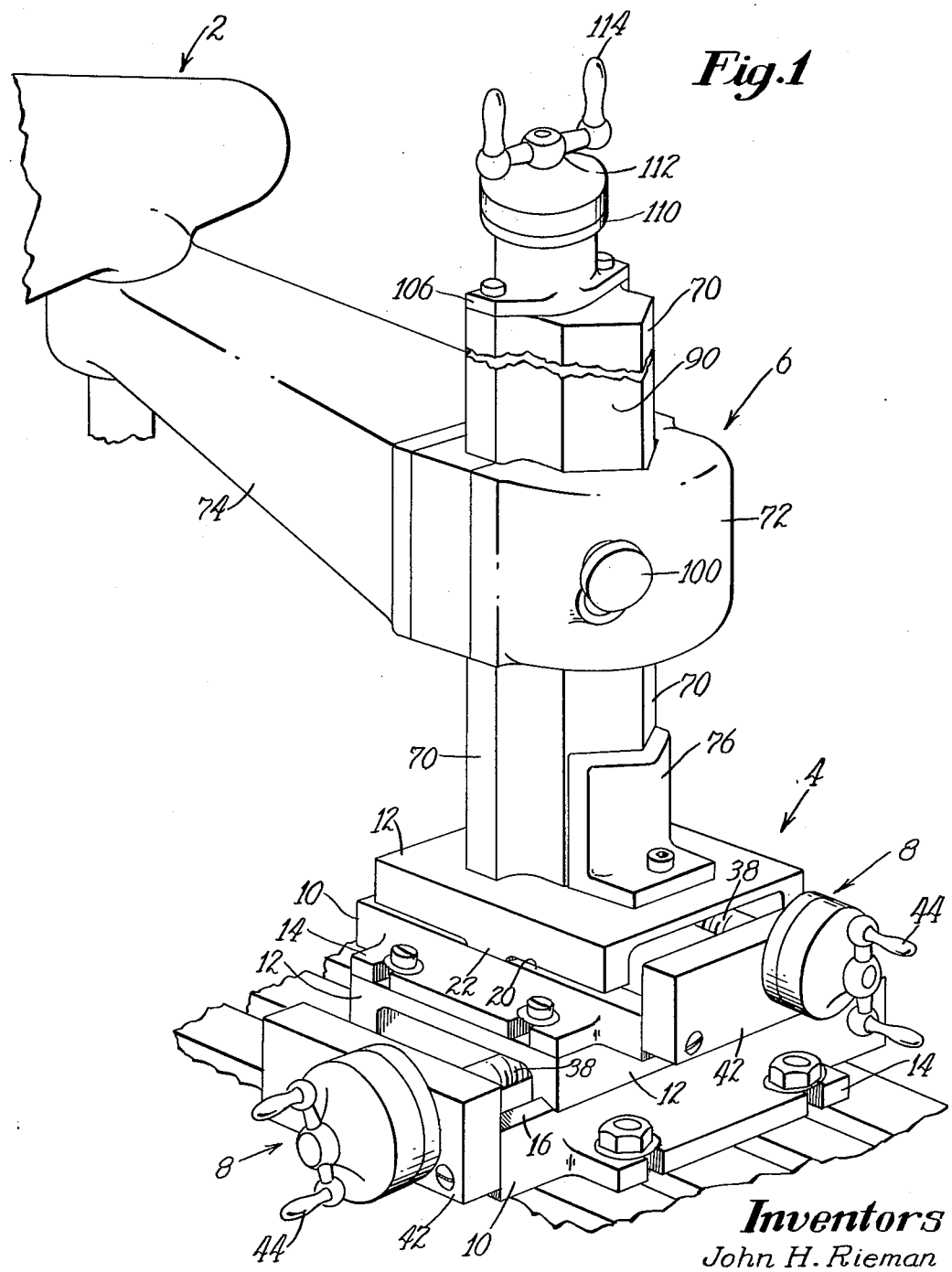
FIG. 1 is a view of a typical combination of precision slide mechanisms embodying the present invention.

Referring to FIG. 1, there may be seen a typical combination of precision slide mechanisms embodying the present invention for mounting an optical comparator unit 2 on a machine tool to permit constant visual observation of a magnified image of a contour being produced The mounting for the unit 2 includes a compound 4 for precisely adjusting the unit in two different directions in a horizontal plane, and a vertical slide mechanism 6 for adjusting the unit in a vertical direction.

The compound 4 includes two similar precision slide mechanisms 8 of which a base 10 of the upper slide mechanism is fixed on the slide 12 of the lower mechanism. Since both mechanisms 8 are similar only one will be described in detail as illustrated in FIGS. 2–5. The base 10 is provided with outstanding lugs 14 having slotted openings by which the base may be fixed to a machine table as in the case of the lower mechanism or to a slide 12 as in the upper mechanism as seen in FIG. 1. The base is further provided with a V-shaped guide rib 16 which extends parallel to a desired path of movement of the slide 12. The rib is accurately ground and is slidably engaged by two mating V-shaped pads 18 on the underside of the slide 12. The pads 18 and the rib 16 coact to guide the slide for movement in the desired path. The base 10 is also provided with a flat surface 20 which extends parallel to the desired path of movement of the slide and which is engaged by a flat surfaced pad 22 on the underside of the slide. The pad 22 and surface 20 coact to guide the slide and also to prevent bodily rotation of the slide out of a horizontal plane about an axis formed by the rib 16.

As best seen in FIGS. 2 and 8, the pads 18 and 22 form three points which define a plane of movement for the slide 12 along the surfaces of the rib 16 and surface 20 of the base 10. According to good geometric principles a plane is best established by three points, the points in the present instance of course being flat surfaces of sufficient area to avoid galling when moved along the base guiding surfaces. Further according to best principles, the slide and base are held together by a preload force applied at a single point along an axis A (FIGS. 2, 5 and 8) which is located relative to each of the pads 18 and 22 so that the effective force applied at each pad is substantially equal. Since the area of each pad is substantially equal the sliding force of friction is also substantially equal at each pad. For applying such a force, the slide 12 has secured thereto one end of a bolt 24 which depends from the slide through a slot 26 in the base extending parallel to the path of movement of the slide. On the underside and adjacent the slot, the base is provided with a flat surface 27 against which bears a plate 28 forming the upper race of a frictionless linear bearing 29. The bearing has a plurality of rolls 30 disposed between the plate 28 and a lower raceway plate 32. The preload force is applied to the slide and base by a nut 34 and a series of spring washers 36 on the lower end of the bolt 24, the bearing 29 acting to reduce friction so the only substantial forces of friction resisting movement between the slide and base exists at the pads 18 and 22. Thus, it may be seen that contrary to the usual design of precision slide mechanisms the preload force results in a minimum of friction. Another extremely important result obtained by the use of three points to define a plane of motion involves the manufacture of the mating parts which completely avoids the expensive hand fitting of mating parts where continuous guiding surfaces are used. With the present slide construction the mating surfaces may be ground to the required accuracy without expensive manual scraping.

For moving the slide along the base there is provided a lead screw 38 which is mounted for rotation in ball bearings 40 carried against axial movement by a block 42 fixed to one end of the base 10. The lead screw is threaded through the bolt 24 and at one end is provided with a handle 44 by which the screw is rotated to drive the slide. A dial 46 rotatable with the screw, and a collar 48 fixed to the block 42 are marked with indicia calibrated to permit extremely accurate adjustment of the slide. The axis of rotation of the lead screw is coincident with a line B (FIG. 8) representative of the direction of the resultant of the composite sliding friction forces acting at the pads 18 and 22. The axis of the lead screw also intersects the axis of the bolt 24 along a plane C (FIGS. 5 and 8) which intersects the mating surfaces of the pads 18 and 22 and the surfaces of the rib 16 and surface 20. By this arrangement, the driving force applied to the slide does not apply turning moments which would distort the slide or tend to divert its movement from the desired path. It should be obvious that other means could be used for driving the slide by the application of force at the above position and direction without departing from the scope of the invention.

The vertical slide mechanism 6 includes a post 70 (FIGS. 6 and 7) on which a slide 72 is mounted for vertical sliding movements. The slide 72 has extending therefrom an arm 74 on which may be mounted the unit 2. The post 70 is secured to the slide 12 of the upper mechanism of the compound by a bracket 76 and has a cross section (FIG. 10) adapted to satisfy the over-all stiffness necessary to support the unit 2 at the end of the arm 74 against external forces.

The post at one side is provided with two flat surfaces 78 (see also FIG. 9) extending parallel to the desired plane of movement of the slide 72. The slide is provided with three flat pads 80 adapted to slide along the surfaces 78 and coact therewith to define the plane of movement of the slide in the same manner as the three pads 18 and 22 of the horizontal slide mechanism 8. Without repeating details, it may be said that the same three point geometric principle used to define a plane of motion applies equally to the vertical slide mechanism 6 as to the horizontal slide 8. For determining the direction of movement of the slide 72 along the above plane, the slide is provided with two flat pads 82 adapted to slide along a surface 84 also extending on the post parallel to the desired direction of movement of the slide. Thus, the pads 80 and surfaces 78 cooperate to determine the plane of movement of the slide while the pads 82 and surface 84 determine its direction along the plane.

For applying a preload force to hold the pads and surfaces in engagement, the slide carries a block 86 on which is rotatably mounted a pair of rollers 88 adapted to roll along a flat surface 90 extending parallel to the path of movement of the slide. The block 86 is provided with a stud 92 which extends into a bore in a set screw 94 threaded in the slide 72. The stud has a shoulder against which bears one end of a series of nested spring washers 96. The other end of the series of washers engages the inner end of the set screw 94 which is tightened thereagainst to cause the spring washers to apply a predetermined yielding force pressing the rollers 88 against the surface 90 of the post. The upper end of the block 86 normally bears against a shoulder 98 of the slide, but may be pressed against the post by tightening a clamp screw 100 against the block to fix the position of the slide on the post. For this purpose the block pivots about the axis of the rollers. The surface 90 and the direction of the force applied normal thereto by the rollers 88 is disposed at an angle to the disposition of the surfaces 78 and 84 as diagrammatically illustrated by the arrow F in FIG. 10 to maintain the surfaces and the pads in engagement with substantially equal forces. Thus, while not identical to the horizontal slide mechanism, it may be seen that according to similar principles only a single preload force is applied to the slide and post to maintain the mating parts together. By applying this force through ball bearings in the rollers 88 the only significant forces of friction that must be contended with are present at the point of engagement of the pads 80 and 82 with the surfaces 78 and 84. The exact position and magnitude of the preload force is determined to maximize the restoring torque applied between the slide and post when the mating surfaces are displaced by an external torque. The friction forces at the pads will oppose return of the parts to their desired location while the normal forces will generally aid in their return. The difference between the aiding and opposing effects can be maximized in three dimensions by proper placement of the preload force. In the same manner, the torque required to rotate the mating parts away from their desired positions is also maximized. Here it may be said that friction aids. With the points of engagement of the mating parts geometrically definite with the use of spaced pads it is possible to compute with mathematical precision the exact position, direction and magnitude of the preload force necessary to satisfy the above requirements.

For moving the slide 72 along the post 70, a lead screw 102 is threaded through a lug 104 on the slide. The lead screw at its upper end is rotatably mounted in a block 106 by ball bearings 108 which also fix the lead screw against axial movement relative to the block. The block is secured to the upper end of the post 70 and is provided with a collar 110 having indicia which when compared with indicia on a dial rotatable with the screw enables an operator to adjust the position of the slide with precision. A handle 114 fixed on the upper end of the lead screw provides for manual rotation of the screw. In much the same manner as for the horizontal slide, the axis of the lead screw is substantially coincident with the resultant of the composite forces of friction at the pads 80 and 82 so that the driving force acting to move the slide does not apply turning moments which would distort the slide or tend to divert it from the desired path. Obviously, other driving means using the same principles could be used without departing from the scope of the invention.

From the foregoing it should be apparent that the slide mechanisms described may be constructed in a relatively inexpensive manner and will perform with a high degree of precision. While two forms of slide mechanisms have been described it should be obvious that they both involve similar principles and could be used interchangeably or in other devices or machines or with substantial modification without departing from the scope of the invention.

Having thus described our invention, what we claim as novel and desire to secure by Letters Patent of the United States is:

1. A slide mechanism comprising a first member having guide surfaces extending parallel to a desired plane of movement, a second member having three spaced pads forming a three point bearing engaging said surfaces for locating said first and second members for relative movement along said plane, and means for applying a driving force to said slide in said plane along a line coincident with the resultant sliding friction forces compositely resisting movement of said pads along said surfaces.

2. A slide mechanism comprising a first member having guide surfaces extending parallel to a desired plane of movement, a second member having three spaced pads engaging said surfaces for locating said first and second members for relative movement along said plane, means for applying a preload force at a single point spaced from said pads for holding said pads and said surfaces in engagement, and means for applying a driving force to said slide in said plane along a line coincident with the resultant sliding friction forces compositely resisting movement of said pads along said surfaces.

3. A slide mechanism comprising a member having one or more guide surfaces, defining a desired plane of movement and at least one other guide surface extending parallel to a desired line of movement along said plane, a slide having three spaced pads engaging said defining surfaces for locating said slide for movement along said plane, said slide also having at least two other spaced pads engaging said other surface for guiding the slide for movement along said line, means for applying a single preload force acting on said member and said slide to hold said pads and said surfaces in engagement, and means for applying a driving force to said slide in said plane along a line coincident with the resultant sliding friction forces compositely resisting movement of said pads along said surfaces.

4. A precision slide mechanism comprising a member having a V-shaped guide rib and a flat surface both extending parallel to a desired path of movement, a slide mounted on said member and having two spaced pads mating with said rib and a flat pad engaging said flat surface for forming a three point bearing for guiding said slide for movement along said path, a bolt carried by said slide spaced from said pads and extending through said member, a spring on the bolt, a linear frictionless bearing disposed between said spring and a flat surface on the member, and a nut on the bolt for clamping the spring against the bearing to cause substantially equal preload forces to be applied to each of said pads.

5. A precision slide mechanism comprising a post having one or more surfaces defining a plane extending parallel to a desired path of movement and another surface extending parallel to a desired line of movement along said plane, a slide mounted for movement on said post, said slide having three spaced pads engaging said defining surfaces for locating said slide for movement along said plane, said slide also having two other spaced pads engaging said another surface for guiding the slide for movement along said line, a block, a roll rotatably mounted on said block and adapted to roll along a further surface on said post parallel to said path and angularly disposed to said defining surfaces and said another surface, and spring means acting between said slide and said block for pressing the roll against said post to apply a single force adapted to hold said pads and said surfaces in engagement.

6. A precision slide mechanism comprising a post having one or more surfaces defining a plane extending parallel to a desired path of movement and another surface extending parallel to a desired line of movement along said plane, a slide mounted for movement on said post, said slide having three spaced pads forming a three point bearing engaging said defining surfaces for locating said slide for movement along said plane, said slide also having two other spaced pads engaging said another surface for guiding the slide for movement along said line, and means for applying a driving force parallel to said path along a line coincident with the resultant sliding friction forces compositely resisting movement of said pads along said surfaces for causing relative movement between said post and said slide.

References Cited by the Examiner
UNITED STATES PATENTS

| 1,285,628 | 11/1918 | Craley | 308—3 |
| 1,469,226 | 10/1923 | Langhammer | 82—24 X |
| 1,937,949 | 12/1933 | Flather et al. | 308—3 |
| 2,608,449 | 8/1952 | De Haas | 308—3 |
| 2,675,276 | 4/1954 | Daugherty | 308—3 |
| 2,719,761 | 10/1955 | Bonnafe | 308—3 |
| 2,798,773 | 7/1957 | Walter | 308—3 |
| 2,832,651 | 4/1958 | Berthiez | 308—3 |
| 3,054,645 | 9/1962 | Evans | 308—3 |

FOREIGN PATENTS

| 362,302 | 12/1931 | Great Britain. |

DON A. WAITE, *Primary Examiner.*

MILTON KAUFMAN, ROBERT C. RIORDON,
*Examiners.*